United States Patent [19]

Kanigowski

[11] Patent Number: 5,174,526
[45] Date of Patent: Dec. 29, 1992

[54] ADJUSTABLE LUMBAR SUPPORT MECHANISM FOR AIRLINE PASSENGER SEATS WITH MANUAL PUSH BUTTON AND CABLE CONTROL

[75] Inventor: Andrew S. Kanigowski, La Crescenta, Calif.

[73] Assignee: Futureflite Corporation, Carson City, Nev.

[21] Appl. No.: 799,400

[22] Filed: Nov. 27, 1991

[51] Int. Cl.$^5$ ............................................. B64D 11/06
[52] U.S. Cl. .............................. 244/122 R; 244/118.5; 297/284.4; 297/284.2
[58] Field of Search .......... 244/122 R, 118.5, 122 AG; 297/284 C, 284 A

[56] References Cited

U.S. PATENT DOCUMENTS

| | | | |
|---|---|---|---|
| 3,730,019 | 5/1973 | Ballard | 244/122 R X |
| 3,807,794 | 4/1974 | Beyer | 297/284 C |
| 4,556,251 | 12/1985 | Takagi | 297/284 C |
| 4,576,410 | 3/1986 | Hattori | 297/284 C |
| 4,790,496 | 12/1988 | Marrujo | 244/122 R |
| 5,026,116 | 6/1991 | Dal Monte | 297/284 C |

Primary Examiner—Joseph F. Peters, Jr.
Assistant Examiner—Christopher P. Ellis

[57] ABSTRACT

Presentation of an adjustable lumbar support mechanism for use in the airline aircraft seats. A new method of lumbar adjustment is introduced utilizing a push button (10) and control cable (12) to unlock the positioning rod (42). Rod holds any selected curvature of the lumbar support panel (46). The lumbar panel is formed and preloaded to a convex shape (50) and assumes the most forward adjustment position when control button is depressed and while pressure on the seat back is removed. The lumbar panel is flexible to assume any intermediate curvature when control button is depressed and when the passenger lightly pushes back against the seat back in the lumbar region. The new lumbar system is a fast acting device compared to traditional knob driven units and permits a frequent, quick and easy readjustment of lumbar position whenever said push button is depressed.

4 Claims, 7 Drawing Sheets

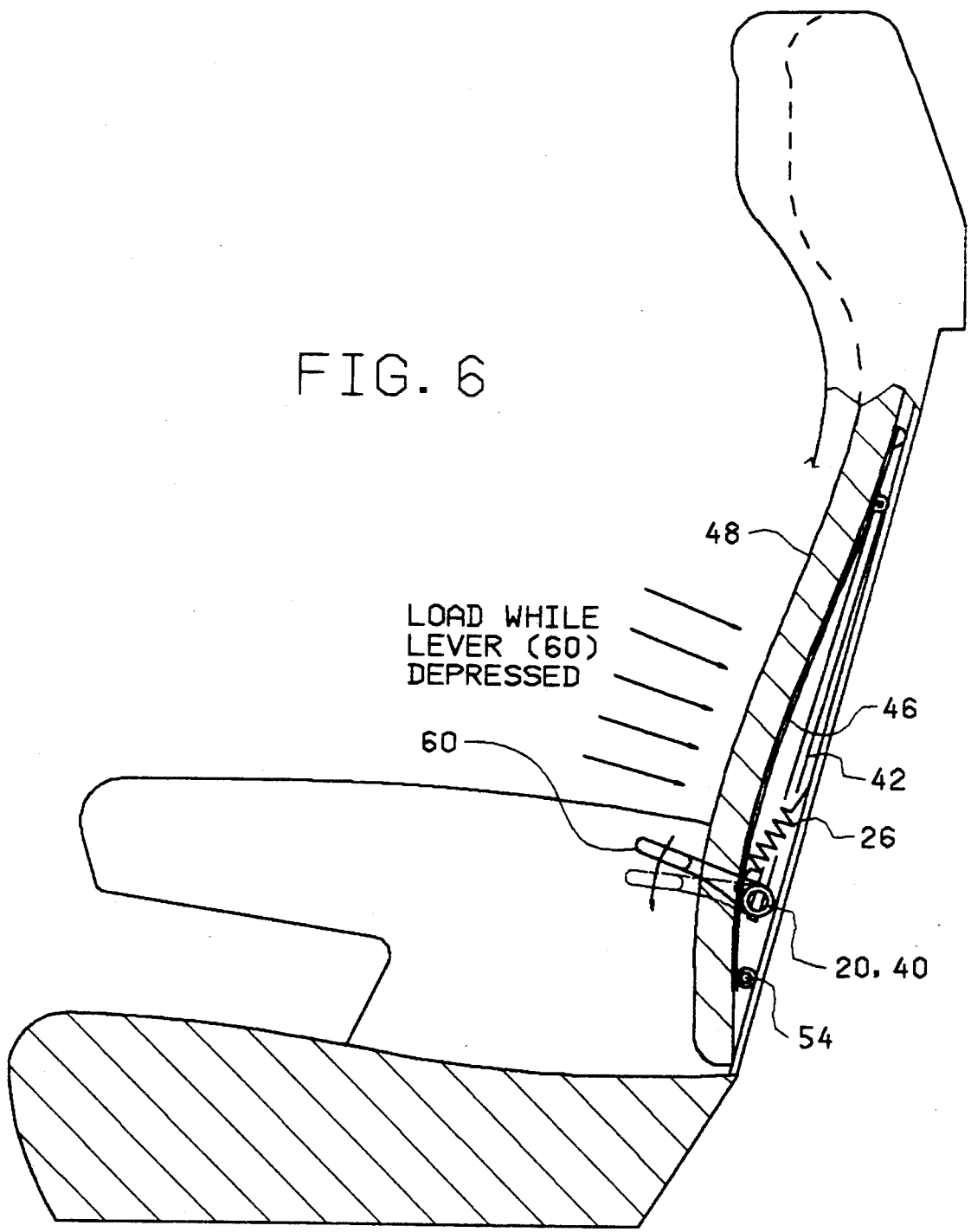

tion that resists the knob. A gear reduction mechanism may be employed to overcome this resistance but it takes many turns of the knob to achieve the required range of adjustment.

ADJUSTABLE LUMBAR SUPPORT MECHANISM FOR AIRLINE PASSENGER SEATS WITH MANUAL PUSH BUTTON AND CABLE CONTROL

BACKGROUND-FIELD OF INVENTION

This patent application covers a new and original design in the statutory class of machines. This invention relates to the mechanism of adjustable lumbar support installed in the back support of the seats for human occupants. More particularly, this invention involves a unique method of adjustment of the back lumbar support intended for use in the airline aircraft passenger seats.

BACKGROUND-DESCRIPTION OF PRIOR ART

Airlines use basically three types of passenger seats: Tourist, Business and First Class seats. These seats exist commonly in double or triple seat configuration. Some tourist class seats exist in quad or quint configurations.

Typically the airline seats do not have any adjustable lumbar support mechanism, just a contoured seat back cushion foam to provide a fixed support of the passenger lower back. Fixed lumbar supports are more or less comfortable, passengers usually complain that the lack of adjustment capability or improper positioning causes pain in their lower backs, especially during a long flight. Some are trying to relieve this discomfort by placing a pillow in lumbar area It is hard to satisfy the various requirements of the flying public with a non-adjustable position of lumbar support developed to fit the average person. An adjustable lumbar support system is needed by the airline passengers to accommodate anthropomorphic differences among the population.

There are various adjustable lumbar support mechanisms utilized in automobile seats (or in other adjustable seats). Typically, these lumbar systems can be divided into three basic categories/groups:

Group 1: Mechanical lumbar units with adjustment control knobs located on the side of the seat back support. Knobs are linked to the moveable lumbar pad. One knob moves the pad in fore/aft direction, the other knob is for vertical adjustment of the pad. This group is the most popular.

Group 2: Pneumatic lumbar units with a pump to inflate a rubber bag located under the seat back cushion. Hand squeezing of the pump creates fore-/aft adjustment of the lumbar bag.

Group 3: Electrical lumbar units with a remote control switch wired to the electrical motor similar to described in U.S. Pat. No. 3,807,794 by Beyer. A motor is attached to the adjustable mechanical lumbar described above in Group 1 or to the pneumatic pump described in Group 2.

Unfortunately, the above lumbar systems are not easily adaptable on airline aircraft passenger seats:

Group 3 (electrical) is expensive and is presently utilized on some of the seats for the First Class passengers only.

Group 2 (pneumatic) is generally not recommended as the rubber bag is sensitive to the aircraft cabin pressure changes. Passengers would feel the bag inflation/deflation with each adjustment of the cabin pressure.

Group 1 (mechanical) is relatively economical but there is no room for adjustment knobs on the back of the multiple seats used by the airlines. Knobs must be fairly large in diameter to assure that turning by hand is not too difficult.

Adjustment mechanism has a certain amount of friction that resists the knob. A gear reduction mechanism may be employed to overcome this resistance but it takes many turns of the knob to achieve the required range of adjustment.

In addition to the knob size, a substantial clearance is required for hand access to operate the knob. Such access clearance exists only on the single seats (for single occupant) or when the seats are well separated, like the front seats in an automobile.

Consequently, the major problem is that there is not enough room for a traditional lumbar adjustment knobs between the seat backs in the multiple seat. A typical airline seat, say a tourist class triple, is narrow and has two center armrests that fold-up for stowage between the two adjoining seat backs. The stowed center armrest occupies the entire narrow space between the seat backs. There is no room for knob placement in this area. There is also no room below the armrest level since this area is occupied by the armrest attachment structure. Placement of the knob on a side of the back support is also restricted by the food trays mounted behind the back. The tray is foldable and has two support legs, one on each side. When the tray is stowed-up both legs are in a position that would interfere with the lumbar knob.

In short, a typical lumbar adjustment knob cannot be placed on the airline seat back support as the knob would interfere with a foldable center armrest or with the legs of the food tray.

Accordingly, the main disadvantage of existing adjustable lumbar systems is that they are not suitable for placement on the multiple airline seats where the passengers are seating tight side-by-side. Having no other workable alternatives, with exception of some First Class seats, the airlines are still carrying most of their passengers without any lumbar adjustment which is needed by many travelers during a long flight.

DESCRIPTION OF INVENTION—HOW TO USE

This design innovation is related to the adjustable lumbar support developed for application on all airline passenger seats: Tourist, Business and First Class seats.

As shown on submitted drawings (FIG. 1A, 1B) this design innovation eliminates existing knob for lumbar adjustment and replaces it with a simple push button control that is activated by a finger push only. The push button is located in the seat armrest and is virtually identical to the button presently used for adjustment of the seat back recline angle.

For better understanding, the reader may recall the last flight in the airline seat and the way the seat back recline angle is adjusted using control button. The only difference is that a familiar button is linked not to the recline mechanism but to the adjustable lumbar mechanism that provides a variable curvature in the area of the seated human occupant's lower back and spine.

The new lumbar support mechanism is described in full detail in the next section—How to Build. Following here is a brief description of the operation method and the essence of the new lumbar adjustment principle:

a). Light pressing by a finger on the control push-button releases the locking mechanism of the adjustable lumbar support that is located under the seat back cushion.

b). When the control button is depressed (lumbar unlocked) and pressure on the seat back is removed (passenger leaning or bending forward) the spring loaded lumbar pad is free to move all the way to the forward end of adjustment limit (toward the back of the seated occupant).

c). Spring loaded lumbar pad support (under the seat back cushion) has a flexible surface to provide a variable curvature in the lower spine area of the seated occupant. The curve is most convex at the forward end of adjustment limit (lumbar surface bend forward). The surface is in a near flat configuration when depressed toward aft end of adjustment limit.

d). With the lumbar control button depressed, the passenger lightly pushes back against the spring loaded lumbar pad to achieve desired position/curvature of the back. Then the button is released to lock-in that lumbar position. This step is similar to the way a seat back recline angle is adjusted in the current airline seats.

e). When the control button is not depressed (lumbar locked) the lumbar holds any intermediate adjustment position selected earlier by the seat occupant. This position does not change when the seat occupant moves in his seat or when a variable back pressure is applied at the seat back or lumbar.

f). Total adjustment range is about two inches between both end positions in fore/aft direction. The curve changes substantially between near flat and full convex mode to follow closely the natural curvatures of the human spine while bending. The increments of adjustment are small, almost continuous within the adjustment range.

g). The lumbar system described here is a fast acting device compared to traditional knob driven units. The new lumbar mechanism follows spinal column bending shape immediately after control button is depressed. This feature permits frequent readjustment without the necessity of frequent forcing of knob resistance.

h). Vertical adjustment capability is not covered by this patent application as the vertical adjustment is not effective with this type of variable curvature lumbar, especially when the curve is in the near flat (aft position). Vertical adjustment does not provide significant improvement of comfort if lumbar is positioned at the correct height above the seat bottom cushion level. Please note, dimensional differences between short and tall individuals are not in the lumbar area when both individuals are not in the lumbar area when both individuals are seated (similar distance between the seat level and lower intervertebral disks in the spinal column of both individuals).

DESCRIPTION OF INVENTION—HOW TO BUILD

Please refer to submitted drawing Figures. The new adjustable lumbar support mechanism is simple and comprised of a few moving parts only.

FIG. 1A shows the side view of the lumbar support in maximum forward adjustment (full convex), FIG. 1B shows the lumbar in full aft position (near flat).

The push button control 10 and cable 12 is virtually identical to the control button/cable currently used for the airline seat back recline angle adjustment. The button 10 is installed into mounting hole 14 in the seat armrest 16.

Flexible cable 12 is routed inside of armrest 16 structure and runs toward bellcrank arm 18 mounted on the locking/trigger tube 20. Cable 12 is of standard "pull" type, it has an external conduit sleeve 22 and internal wire 24. Finger push on button 10 pulls internal wire 24 inside of conduit 22. Reverse action is accomplished by tension spring 26 attached to the bellcrank arm 18. Spring 26 pulls on cable wire 24 in reverse direction when the finger pressure on button 10 is removed.

FIG. 2 shows the front view of the new lumbar support. The locking/trigger tube 20 is mounted horizontally across the seat back rigid support 28. It is retained in place by three brackets 30 attached to he back support 28. The tube 20 can rotate around its center line as each bracket 30 has a bushing hole permitting rotation of tube. Movement of tube 20 in axial direction is restricted by stop bracket 34 attached to tube 20 between mounting brackets 30.

FIG. 3 shows the bellcrank arm 18 is attached to tube 20 on either end using pin 36 or any other means to secure the bellcrank on tube. Cable end clevis 38 is attached to the bellcrank arm 18. Pulling on cable 24 (by pressing button 10) rotates the bellcrank arm 18 and tube 20 in one direction. Releasing of button 10 causes the bellcrank arm 18 and tube 20 to return to the original position as the tension spring 26 pulls in the opposite direction. Cable external conduit sleeve 22 is stationary and is firmly attached to the seat back structure 28 using mounting bracket 32.

FIG. 4 shows the locking/trigger tube 20 has a hole 40 drilled thru in the middle of tube. Adjustment rod 42 is inserted thru hole 40 in perpendiuclar direction. The rod 42 has multiple grooves or notches 44 cut around the diameter of rod. Diameter of hole 40 is larger than maximum diameter of rod. The rod 42 can move along its center line in a vertical direction when hole 40 is aligned with center line of rod. The rod 42 is locked in place and can not move vertically when locking tube 20 is rotated and the edges of hole 40 are engaged on top and bottom with the rod grooves or notches 44. Tube 20 has a thin wall to assure engagement of grooves 44. Tension spring 26 (FIG. 3) assures that tube 20 is rotated all the way to the limit when edges of hole 40 are firmly resting against grooves or notches 44. It is only when button 10 is depressed that tube 20 and rod 42 are disengaged and vertical motion of the rod is possible. In all other situations the rod 42 is locked to prevent a motion in vertical direction. Stop bracket 34 has a perpendicular holes to guide rod 42 in line with the hole 40 drilled in tube 20. This prevents accidental disengagement of grooves 44 and edges of hole 40.

FIG. 5 shows a vertical cross-section thru the center of lumbar mechanism. The lumbar support panel 46 is flexible and is placed under the seat back cushion 48 and in front of the rigid back structure 28. The lumbar panel 46 is made from flexible material such as thin sheet of hardened steel or a sheet of non-metallic composite or plastic panel with molded surface beads or ribs to assure a spring ratio similar to the sheet made of steel.

Lumbar support panel 46 is formed to a bend configuration that resembles an arch shape 50 shown on FIG. 1A and FIG. 5. The free condition (unloaded) panel 46 curvature shape (arch 50) is contoured to follow the natural curvature of the human spine in the lower back area when such spine is fully bend in forward direction (when belly forward and upper torso leaning back). In this free condition the panel 46 is most convex with the highest point approximately three inches above flat surface of the rigid back support 28. When the load is applied at the panel 46 (FIG. 1B) against the arch 50, the curve starts to flatten until it rests against the center rod 42 or it may rest on optional limit stops protruding from surface 28 (not shown). When load is removed, the panel 46 returns to the original full convex arch shape 50 using the spring ratio of flexible material used for construction of panel 46.

Additional torsion spring 52 may be utilized as shown on FIG. 2 and FIG. 5. Combined spring ratio of curved panel 46 and torsion spring 52 shall be adequate to assure proper balance to counteract the pressure from the back of the seat occupant when adjustment button 10 is depressed.

FIG. 2 and 5 shows the lumbar support panel 46 is attached near lower edge to the back support 28 using hinge 54. Alternatively, panel 46 may be attached directly to the back support structure 28 but in such a way that a slight rotation of panel lower edge is available to follow changes in the panel curvatures. For example, a row of rivets may be used at lower edge and a parallel bead in panel 46 to provide the flexibility required in this area. At the upper edge 56 (FIG. 5) the panel 46 rests directly on the back support structure 28 and is not attached to permit vertical dislocation of upper edge 56 along surface 28 during entire range of lumbar adjustment. That means upper edge 56 slides freely in upward direction on rigid surface 28 when panel 46 is depressed from full convex arch 50 to near flat configuration shown on FIG. 1B.

The rod 42 upper end (FIG. 5) is attached permanently to the lumbar panel 46 near upper edge 56 to assure that rod 42 can move vertically to follow vertical movement of edge 56. In other words, when panel 46 is depressed the rod 42 is pulled up by the panel upper edge 56. As described earlier (FIG. 4), lower end of rod with grooves 44 is engaged into locking hole 40 of the locking tube 20. Vertical dislocation of rod 42 is permissible only when grooves 44 are disengaged from the edges of hole 40. That is when the control button 10 is depressed only. As such, the rod 42 acts like a positioning device of panel 46 to hold any preselected lumbar support curvature position.

Consequently, the fore/aft adjustment of lumbar panel 46 is available when button 10 is depressed and the passenger applies pressure against the seat back to achieve a desired position of his/her spinal column. The increments thru adjustment range are almost continuous and depend on the dimensional spacing of the rod grooves 44. When button 10 is released the assembly holds any preselected intermediate position regardless of the loads applied against the seat back. When button 10 is depressed while there is no load at the back, the lumbar is unlocked and free to move to the full convex and forward position.

OBJECTIVES AND ADVANTAGES

The new adjustable lumbar support design is intended for application on all airline aircraft seats: Tourist, Business and First Class passenger seats. Previously, only some of the First Class passengers were able to afford the seats equipped with the adjustable lumbar supports. The rest of the flying public was generally confined to the seats without any lumbar adjustment capability. A conventional seat back with fixed lumbar to fit average population was not able to suit individual requirements.

Adjustable lumbar support has been available in some automobile seating for quite some time but previous designs are not easily adaptable for wide use on airline seats. The need for a better than fixed lumbar support is well documented and is widely recognized by a majority of air travelers. Frequent adjustment of the lumbar curve is necessary on long flights to relieve pain in the same manner as body movement is needed to relax the muscles and the joints. Static muscular tension in a seating position quickly causes discomfort, especially in a seat with badly contoured seat back support. A tired passenger may be recognized by the frequency of his movement in the seat.

Adjustable lumbar support in all of the airline seats would help to reduce the number of complaints regarding back pain after the flight. The new adjustable lumbar design is tailored specifically to accommodate unique airline seat requirements. The simplicity of its mechanism will permit a light and easy to maintain lumbar support for wide airline application. The new design solves a need that has been recognized for a long time in this industry. The seat makers have failed so far to provide a workable solution to satisfy these requirements.

The passengers will not need any training in operating the new lumbar adjustment mechanism. Pressing on the push button and on the seat back simultaneously is a natural routine to adjust the seat back recline angle. Identical habits are needed to operate both seat recline and this new lumbar mechanism. Even when the recline and lumbar buttons are mistaken by the passenger he/she will quickly feel on the back and learn which button is for what purpose.

DRAWING FIGURES

In the drawings, closely related figures have the same number but different alphabetic suffixes.

Figure 1A:
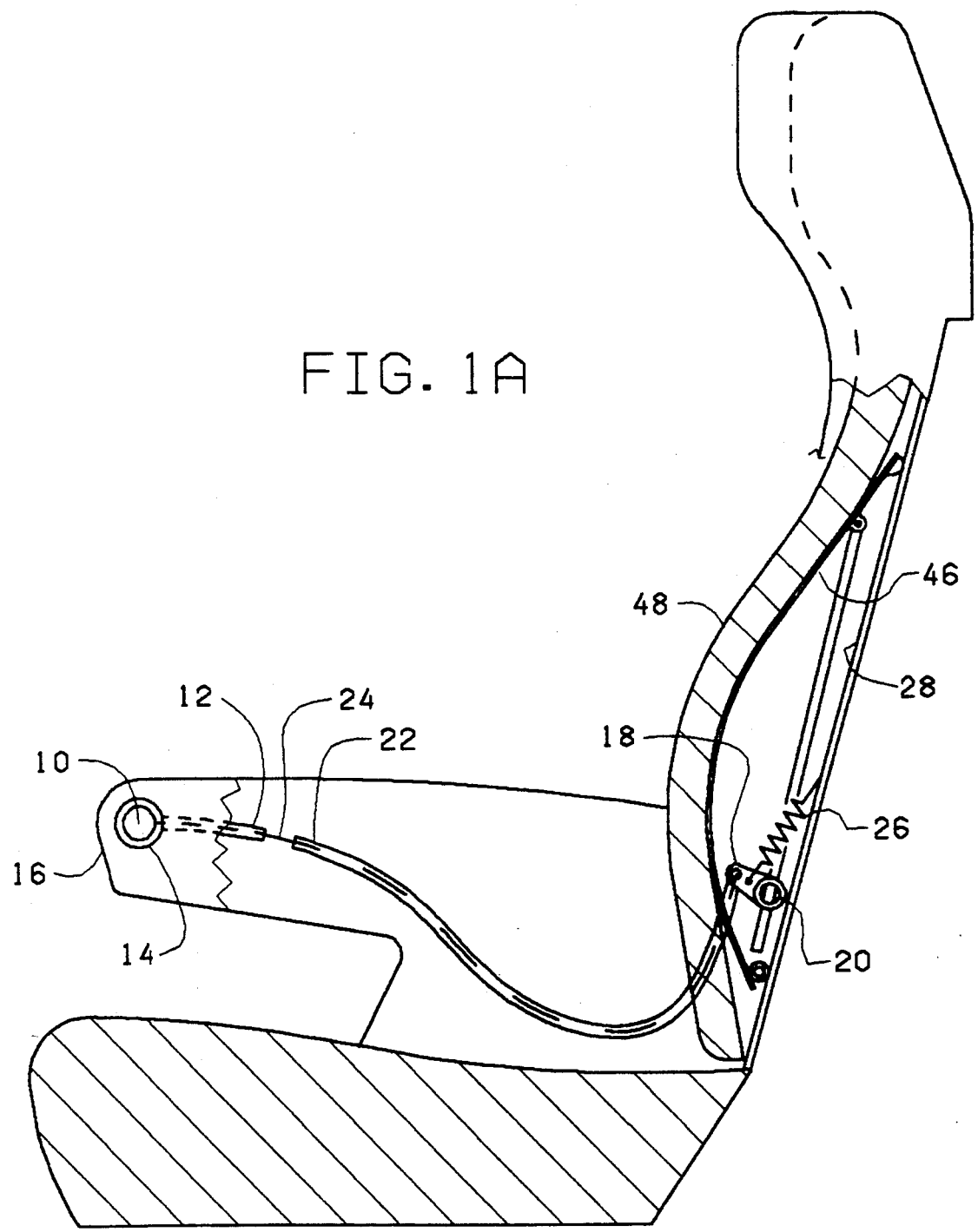
FIG. 1A shows the side view, airline seat, lumbar support in max forward adjustment (full convex)
Figure 1B:
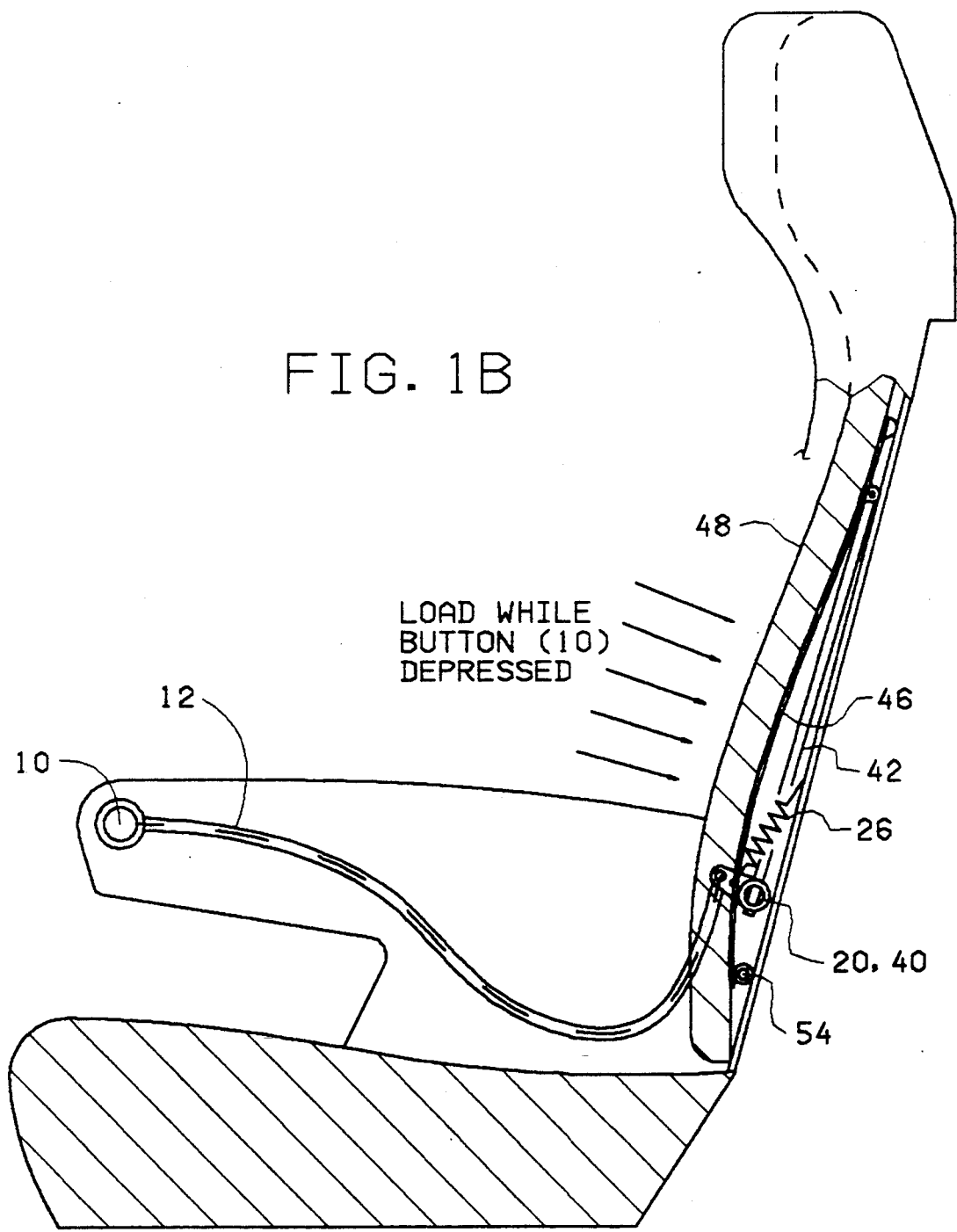
FIG. 1B shows the side view, airline seat, lumbar support in max aft adjustment (near flat)
Figure 2:
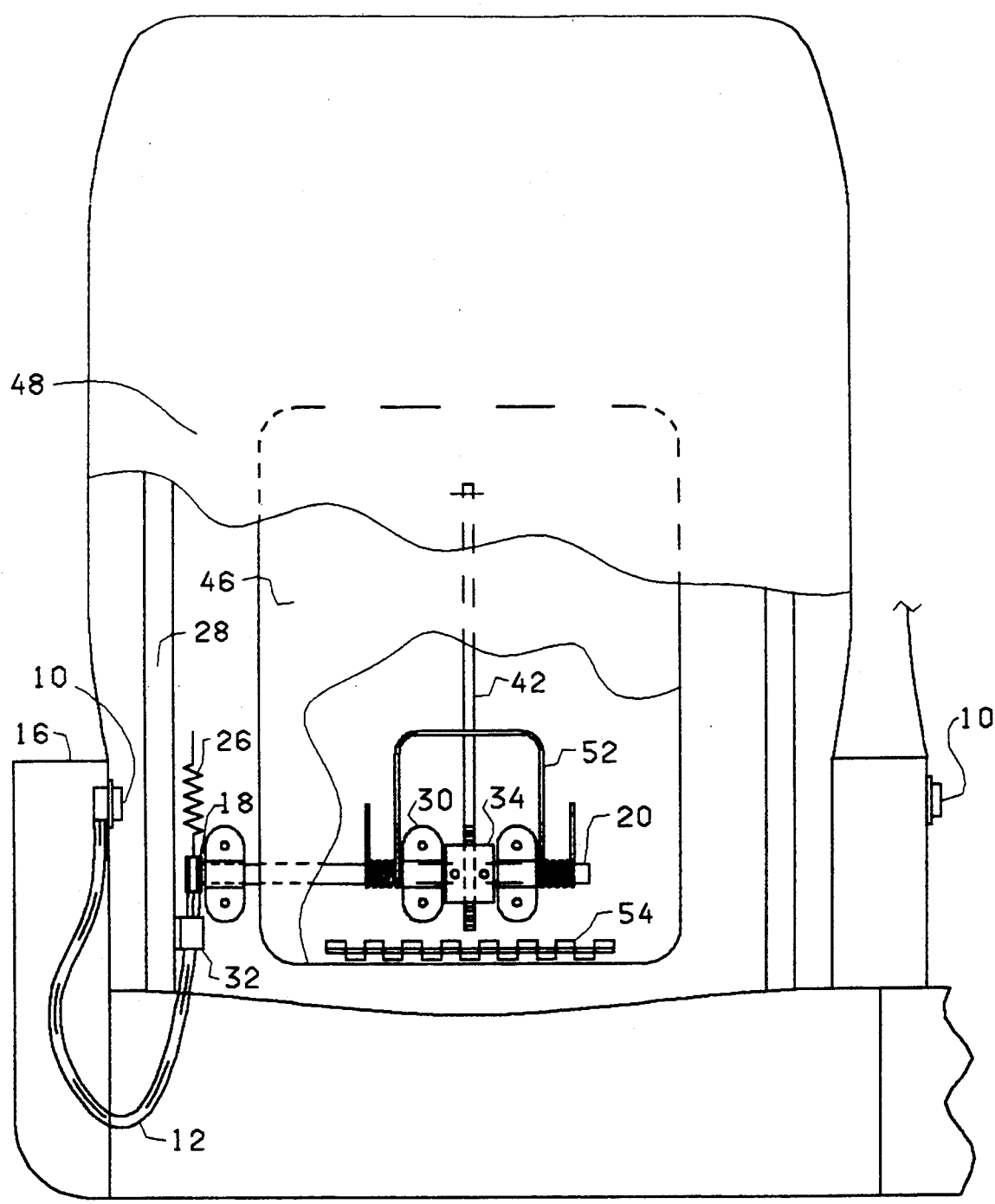
Figure 3:
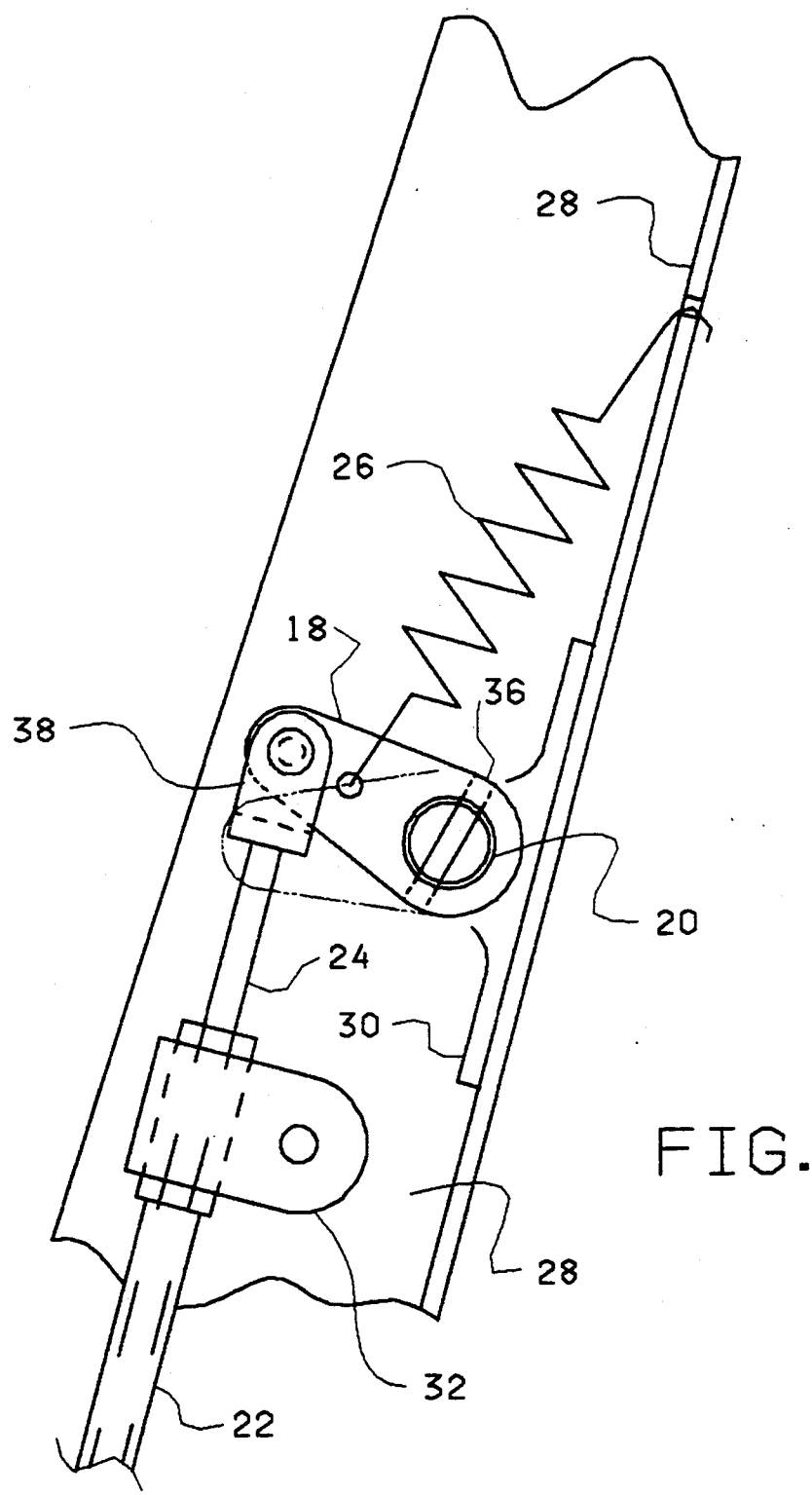
Figure 4:
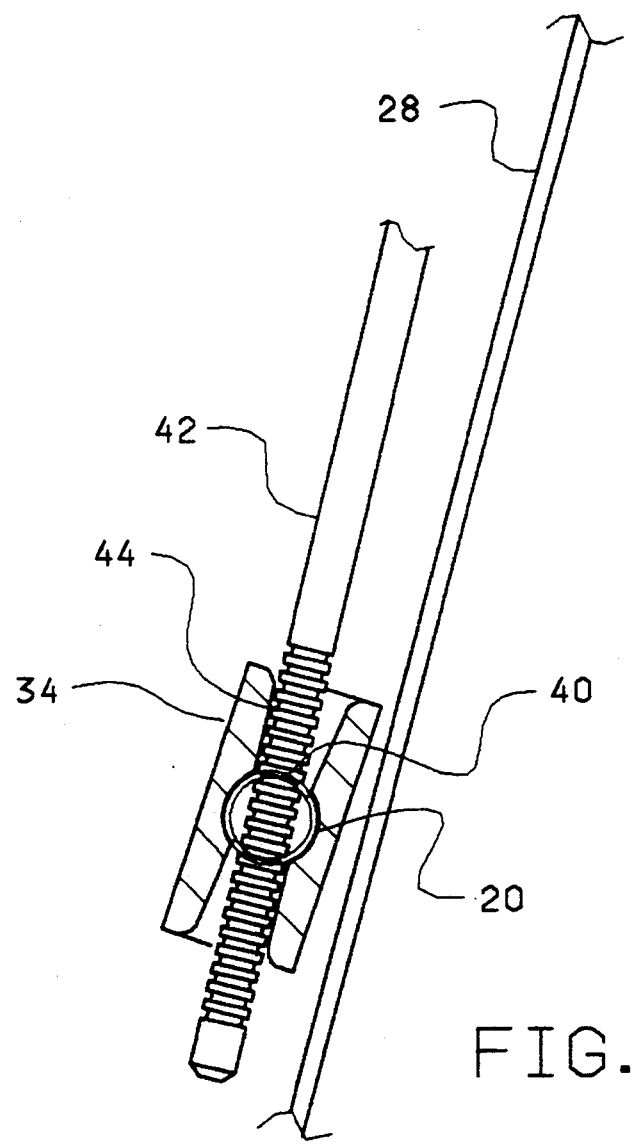
Figure 5:
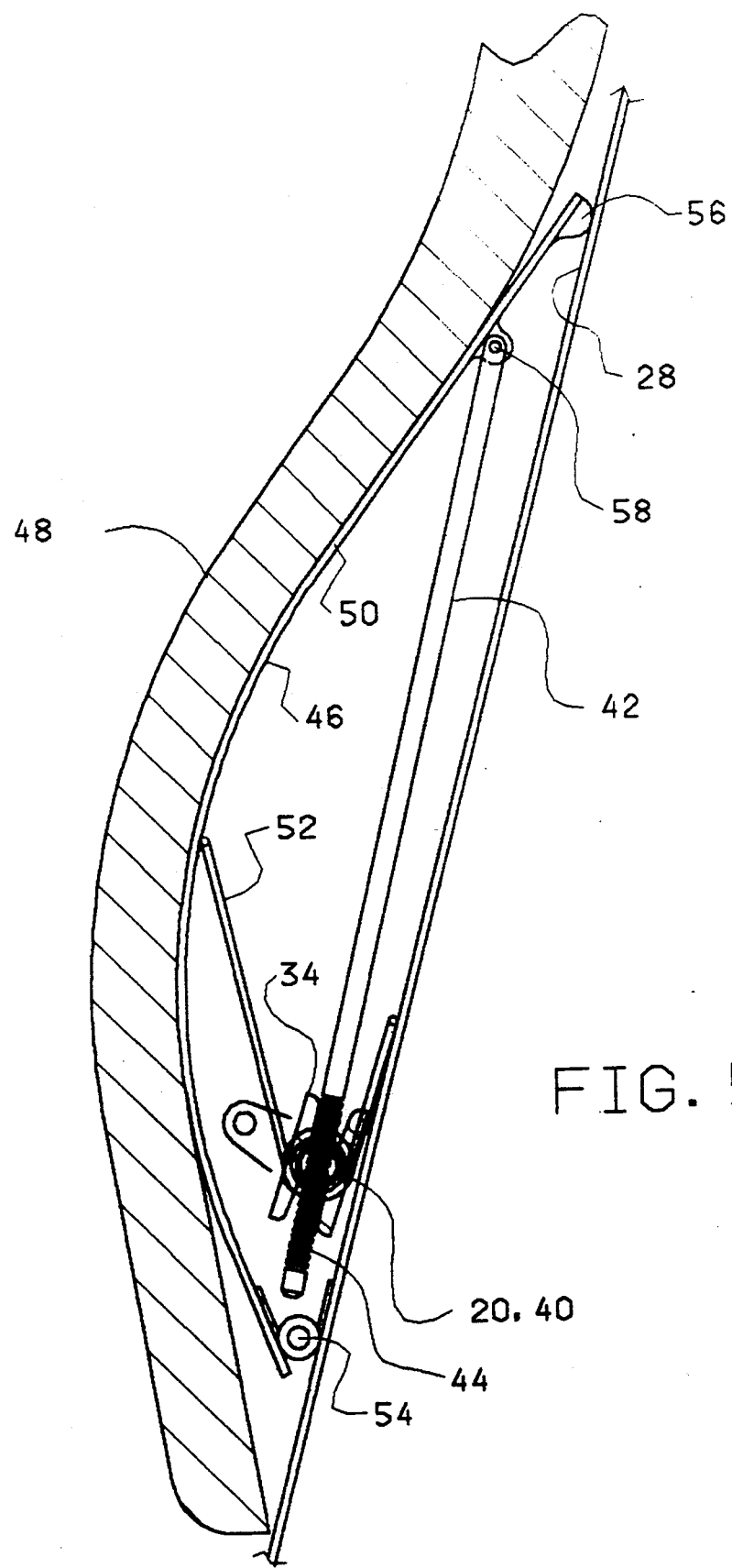

FIG. 2 shows the front view, airline seat, lumbar support installed under the seat back cushion FIG. 3 shows the details of control cable attachment to the bell crank and locking/trigger tube FIG. 4 shows the side view of locking/trigger tube and adjustment rod and grooves engagement detail FIG. 5 shows the side view of vertical cross section thru the center of lumbar support FIG. 6 shows the alternate lumbar control lever attached to tube instead of the push button, cable and bellcrank

REFERENCE NUMERALS IN DRAWINGS

10—control push button
12—control cable
14—mounting hole for control button
16—seat armrest
18—bellcrank arm
20—locking/trigger tube
22—cable conduit sleeve
24—cable internal wire
26—tension spring
28—seat back rigid support
30—tube mounting bracket
32—cable mounting bracket
34—guide/stop bracket
36—pin, bellcrank 38—cable end clevis
40—locking hole in tube
42—adjustment rod with grooves
44—multiple grooves or notches
46—flexible lumbar support panel
48—seat back cushion foam
50—arch shape, lumbar support
52—torsion spring
54—panel lower hinge
56—panel upper edge
58—pin, rod
60—alternate lever

SUMMARY, RAMIFICATIONS AND SCOPE

The new adjustable lumbar support is easy to build, install and operate on all passenger seats in the airline aircraft. As shown in previous sections of this patent application the new adjustable lumbar mechanism will benefit all passengers by providing more comfort during air travel.

The new and unexpected results which flow from this design were not shown or suggested in previous airline seating. At the time of this writing, this inventor has accumulated more than 11 years of continuous professional experience in the design of aircraft seats. It is believed that this invention will provide a workable solution that is significantly different from anything heretofore designed for similar applications.

The high degree of novelty is simply in that fact that current airline seats generally do not have any adjustable lumbar mechanism available except for a different lumbar system utilized on some of the First Class seats. This existing lumbar support is electrical and operates on completely different principles than those described here. Example of electrical lumbar mechanism is shown in U.S. Pat. No. 3,807,794 by Beyer.

Although the description above and drawings submitted contain many specificities, these should not be construed as limiting the scope of this invention but as merely providing illustrations of some of the presently preferred embodiments of this innovation. For example, the tension spring 26 may be replaced with an opposite compression spring or equivalent torsion spring coiled on the tube 20. Another possibility is in utilization of rubber bungee cords to achieve the described preload of the panel 46 in the most convex shape position or a slightly different method to lock the rod in place.

Also, the lumbar panel may be installed upside down with rivets on the top edge and short positioning rod attached near lower edge of panel.

Another alternate variation of the mechanism described is shown on FIG. 6 where the entire control push button, cable and bellcrank are removed and replaced with a single control lever 60 attached directly to the locking tube 20. Pressing on the lever is equivalent to pressing on the button.

The simplified system shown on FIG. 6 is very suitable for retrofit of existing airline seats. There is no need to drill any holes in the seat armrest for the button/cable installation. The adjustable lumbar mechanism may be added to existing seats under the seat back cushion foam and the control lever 60 would be exposed in the corner between the armrest and the seat back cushion as shown in FIG. 6. This location of the lumbar control lever would not interfere with existing seat structures or with the body of the seat occupant which is well rounded in the area interfacing to the corner described.

The lumbar system described here is also suitable for all other multiple seats, not necessarily the airline seats described in this patent application. Other possible usage is in the field of ground transportation (car, bus, train) or on any other seats for human occupants such as the theater seats, office chains, etc.

Thus the scope of this invention should be determined by the appended claims and their legal equivalents, rather than by the examples given.

I claim:

1. An improved adjustable lumbar support mechanism adapted for use in a backrest of an airline passenger seat, comprising:
   (a) a moveable lumbar support panel element positioned in front of the seat backrest structure and underneath a lumbar seat back cushion,
   (b) a mechanical locking means assembly coupling said moveable panel to a rigid backrest support frame and permitting selected positioning of said moveable lumbar support panel element;
   (c) a mechanical control push button and cable assembly for manual disengagement of said mechanical locking means with a push button element installed remotely in a seat armrest and with a cable end routed and connected to a mechanical trigger element of said locking means, and;
   (d) a mechanical springload means to provide a preloaded force to said moveable lumbar support panel element wherein said force acts against an occupant's back to counterbalance a pressure from said occupants's back when said control push button is depressed;
whereby such improvement provides:
   (e) a quick and easy readjustment of the lumbar cushion position whenever said control push button is depressed and when a light pressure is simultaneously applied against the back to a desired lumbar adjustment position,
   (f) a firm support of the lower back of the seat occupant throughout an adjustment range and regardless of the pressure applied on the seatback as long as said push button is not depressed,
   (g) further, to couple said remote control push button with the mechanically preloaded lumbar support permits elimination of:
an electrical motor, power source, remote electrical switch; a pneumatic lumbar bag filled with a gas under pressure; or a considerable muscular power in hand and transmission means necessary to develop a rotational energy to operate and readjust a conventional mechanical lumbar support.

2. An adjustable lumbar support mechanism as set forth in claim 1 wherein said moveable lumbar support panel element is made from a generally rectangular piece of flexible plastic sheet material and formed in a generally convex shape conforming to the back of a sitting human.

3. An adjustable lumbar support mechanism as recited in claim 1 wherein said mechanical locking means assembly comprises a vertically extending positioning brace element made of an elongated body of rigid material and a springloaded locking trigger element located in a housing element with a hole; wherein said brace element is inserted through said housing hole and has a multiple of grooves cut generally in a perpendicular direction to provide improved engagement with said locking trigger and to prevent slippage of said brace along its centerline.

4. An adjustable lumbar support mechanism as recited in claim 1 wherein said mechanical locking assembly comprises a manually operated control lever element located near the seatback and coupled directly to said mechanical trigger element of said locking means; whereby a single push on said control lever permits an automatic and instant readjustment of the lumbar support to a desired position within the adjustment range and without the necessity to utilize said remote control push button and cable assembly.

* * * * *